Nov. 16, 1948.　　　　F. WALLER ET AL　　　　2,454,238
ELECTRICALLY ILLUMINATED DISPLAY APPARATUS
Filed July 26, 1944　　　　　　　　　　　　　　4 Sheets-Sheet 1

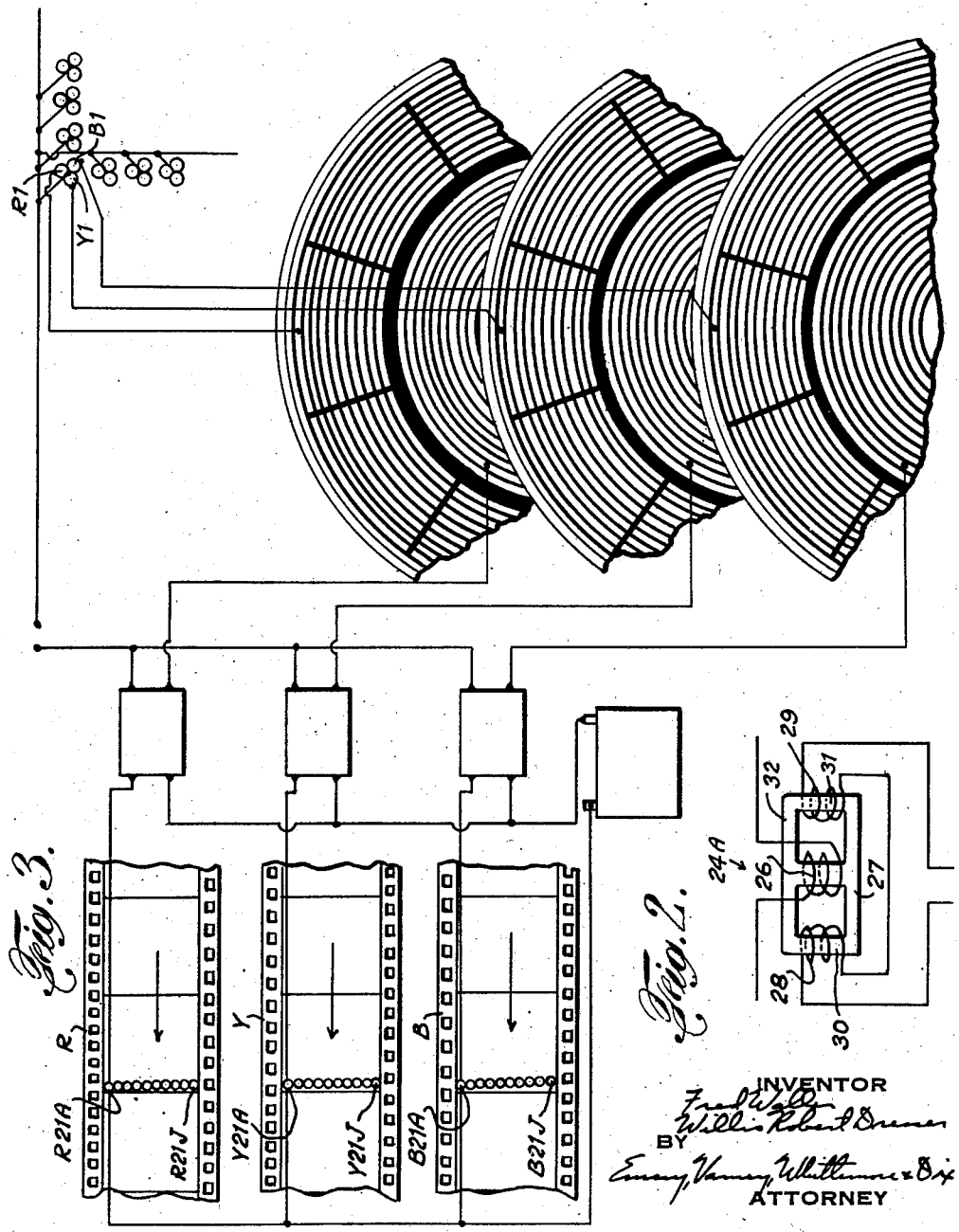

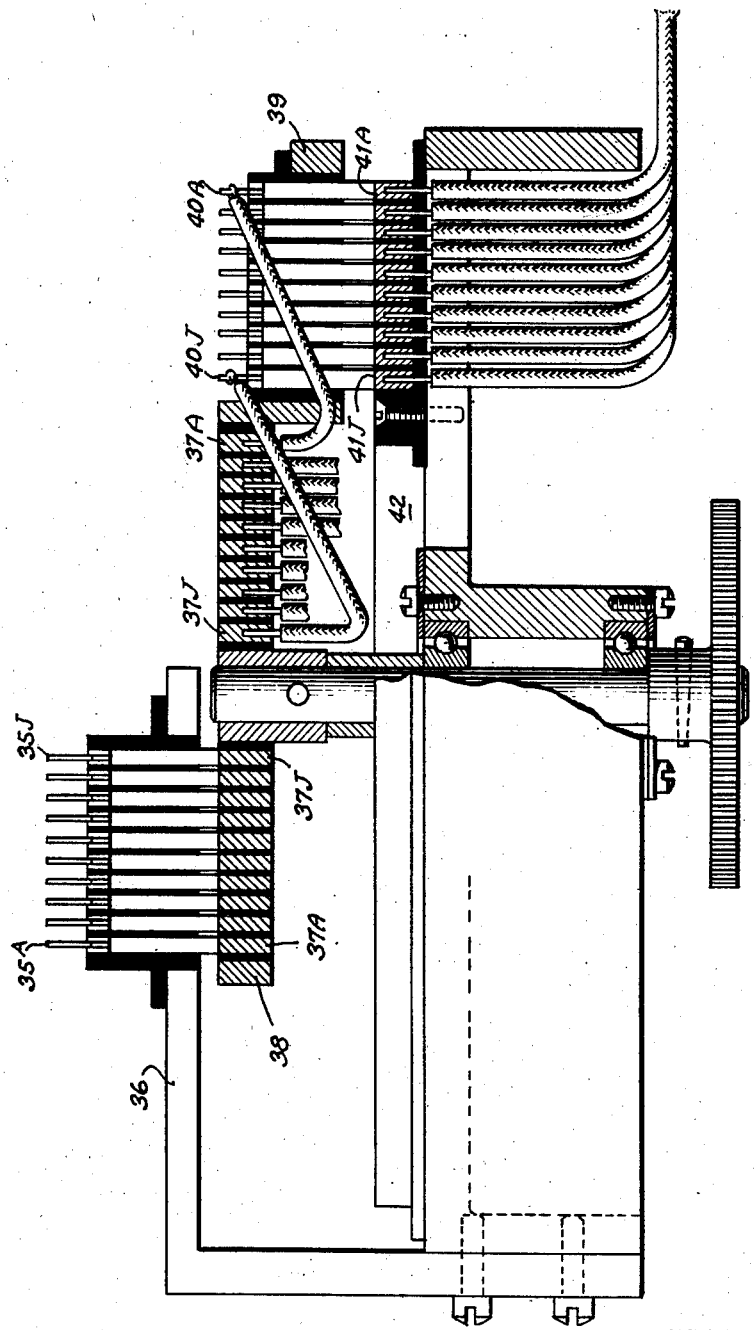

Nov. 16, 1948. F. WALLER ET AL 2,454,238
ELECTRICALLY ILLUMINATED DISPLAY APPARATUS
Filed July 26, 1944 4 Sheets-Sheet 4
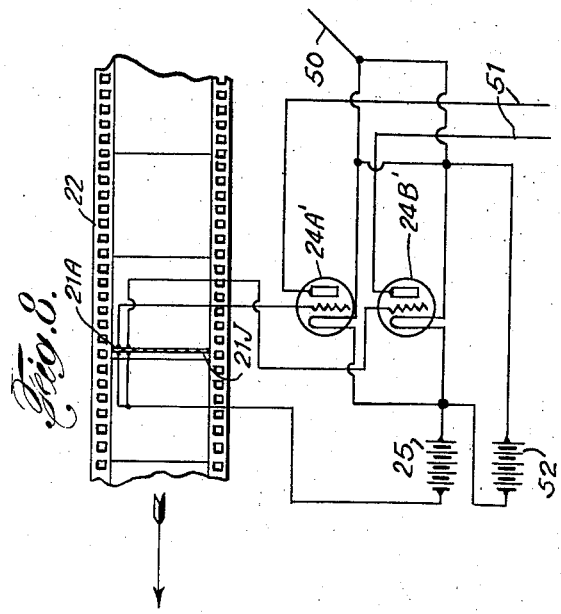
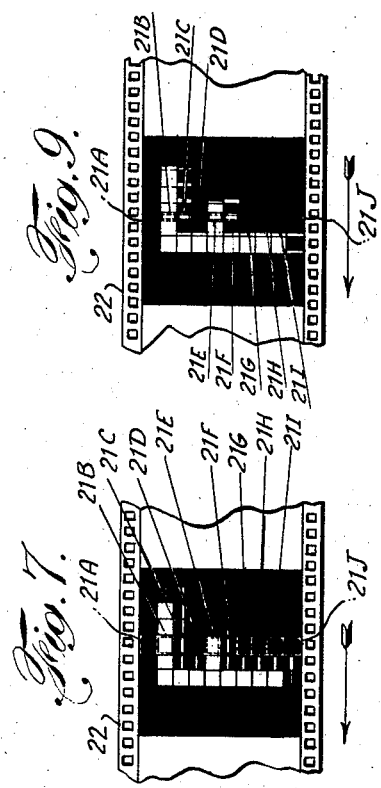
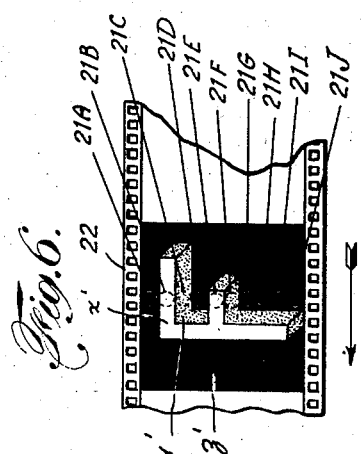
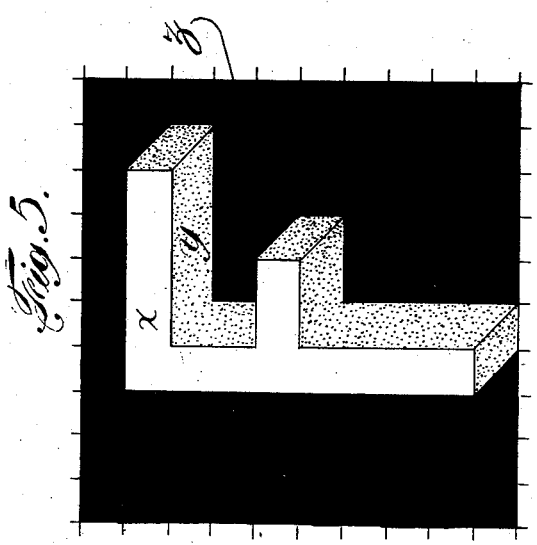
INVENTOR
Fred Waller
Willis Robert Dresser
BY
Emery, Varney, Whittemore & Dix
ATTORNEY Patented Nov. 16, 1948

2,454,238

UNITED STATES PATENT OFFICE 2,454,238

ELECTRICALLY ILLUMINATED DISPLAY APPARATUS

Fred Waller, Huntington, N. Y., and Willis Robert Dresser, Long Hill, Conn., assignors to The Vitarama Corporation, Huntington Station, N. Y., a corporation of New York Application July 26, 1944, Serial No. 546,712

3 Claims. (Cl. 177—350)

This invention relates to electrically illuminated display apparatus of the type used in public places for the illuminated display of advertising, entertainment, educational and other subject matter.

It is an object of the invention to provide apparatus in which present known illuminated display effects, including the effect of motion, can be obtained more simply than is now possible.

It is a further object of the invention to provide apparatus in which entirely novel illuminated display effects may be obtained by controlling the apparent intensity of the light sources used for illumination, as for example, effects of light and shadow. When such effects are combined with the effect of motion, the effects of projected motion pictures may be simulated in an illuminated display.

It is a further object of the invention to provide apparatus in which additional novel illuminated display effects may be obtained by blending colors derived from separate differently colored light sources.

By controlling the intensity of the illumination of the respective colored light sources which are the components of the blended color, an infinite variation of color tone and intensity may be obtained. When such effects are combined with the effect of motion, the effects of projected color motion pictures may be simulated in an illuminated display.

Other objects and advantages of the invention will appear hereinafter.

A preferred embodiment of the invention selected for purposes of illustration is shown in the accompanying drawings, in which, Figure 1 is a top plan view of the commutator device, the electrical connections to the display panel and the control devices being shown diagrammatically.

Figure 2 is a diagram of one of the reactors.

Figure 3 is a diagram showing the application of the invention to color display panels.

Figure 4 is a front elevation of the commutator, partly in section.

Figure 5 is a view of a display panel image which it may be desired to produce.

Figure 6 is a plan view of one frame of a control band having a photographic image thereon adapted to produce the display panel image of Figure 5.

Figure 7 is a plan view of one frame of an alternative form of control band adapted to produce the display panel image of Figure 5.

Figure 8 is a diagram of a modified circuit wherein the apparent intensity of illumination may be controlled by varying the duration of illumination.

Figure 9 is a plan view of one frame of a control band adapted for use with the circuits of Figure 8.

Figure 1:
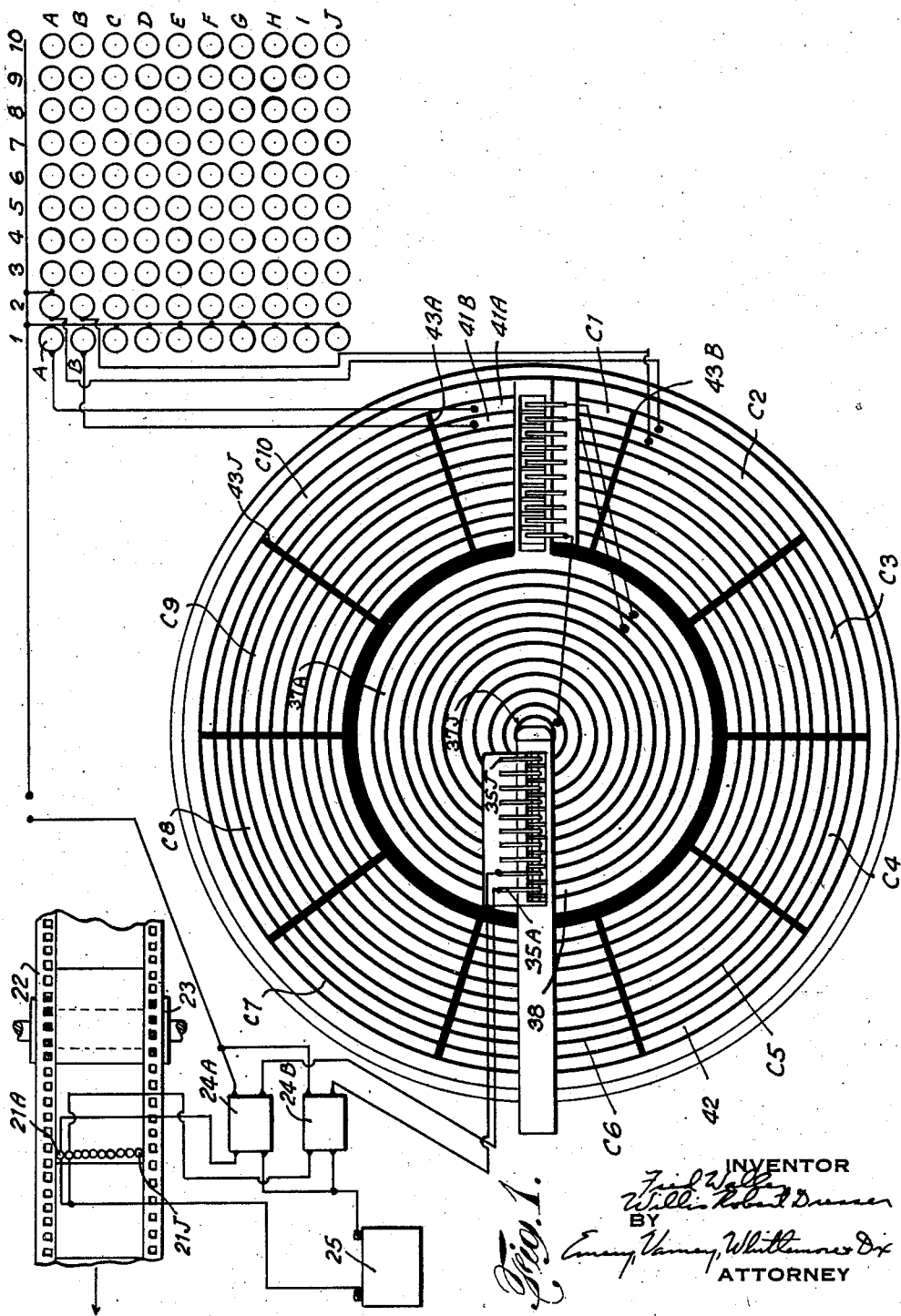

In present day illuminated display devices where it is desired to secure the effect or illusion of motion, it is customary to provide a display panel having a multiplicity of lamps mounted thereon, and a control board having a multiplicity of circuit controlling devices, one such controlling device being provided for each lamp. Such circuit controlling devices may be simple switches or photo electric cells controlled or operated by a suitable moving control band.

One difficulty with such devices has been the excessive complexity and great expense of the control board. For example, in a relatively small display panel having only one hundred rows and one hundred columns of lamps, a control board having ten thousand circuit controlling devices would be required, and in larger display panels the number must be increased in proportion.

According to the present invention the lamps of the display panel are divided into a plurality of groups, and we provide a series of circuit controlling devices in number equal to the number of lamps in a single group only. Through a device in the nature of a commutator, we cause this series of circuit controlling devices to successively control all of the groups of lamps in the display panel. Furthermore, we provide means for controlling the apparent intensity of illumination of each lamp so that effects of light and shadow may be produced.

Thus, referring to Figure 1 of the drawings, we have shown, for purposes of illustration a diagrammatic representation of a display panel having ten rows and ten columns of lamps, the columns being designated by numerals 1 to 10 and the rows being designated by the letters A to J. In the embodiment illustrated, each of the columns of lamps may be considered as a group, and since ten columns are shown, there are ten groups to be controlled in sequence. For controlling the said lamps we provide a series of ten circuit controlling devices designated by the numerals 21A to 21J, which in the preferred embodiment illustrated are photo electric cells. In the embodiment illustrated, said cells are arranged in a column extending transversely across the width of a control band 22, which for purposes of this specification, may be assumed to be a strip of standard motion picture film divided into a series of successive picture image frames in the usual manner. The said control band is preferably fed continuously at a constant rate by a pair of sprocket wheels 23, the rate of feed being such as to cause any desired number of frames to pass the column of circuit controlling devices in any given period of time.

In this embodiment, in order to control the apparent intensity of illumination, each of the circuit controlling devices 21A to 21J is preferably connected with a device for controlling the voltage supplied to the lamps controlled thereby in order that the actual intensity of illumination of said lamps may be controlled. Thus, in the preferred embodiment illustrated, each circuit controlling device is connected in series with the primary coils of a reactor 24A to 24J and with a source of low voltage direct current such as the storage battery 25. The secondary or choke coil of each reactor is connected to a suitable source of electric power such as an ordinary 110 v. alternating current power circuit. One form of such reactor is shown diagrammatically in Figure 2 in which the choke coil 26 connected to the power circuit is wound around the central leg 27 and the primary coils 28 and 29 are wound around the outside legs 30 and 31 of an iron core 32. As will be understood, the alternating current flowing through the coil 26 will be controlled by the current flowing through the coils 28 and 29 which in turn will be controlled by the amount of light received by the photo electric cell in the circuit.

Each of the reactors 24A to 24J is also connected to one of a series of brushes 35A to 35J mounted on a stationary arm 36 of a commutator device, said brushes being adapted to contact the concentric conductor rings 37A to 37J of the rotatable member 38. Said rotatable member has an arm 39 which carries a series of brushes 40A to 40J mounted to contact the concentric conductor rings 41A to 41J mounted in the stationary plate 42.

Each of the brushes 40A to 40J is connected to one of the conductor rings 37A to 37J, the brush 40A being connected to ring 37A, the brush 40B being connected to ring 37B and so on, as shown. The rings 37A to 37J are separated by suitable insulation strips, of course, and the rings 41A to 41J are similarly insulated. In addition, the rings 41A to 41J are broken into segments by equally spaced radial insulation strips 43A to 43J which divide the rings into a series of ten commutator sections designated as C1 to C10. Each of the segments of commutator section C1 is connected to one of the lamps in column 1, the segment of ring 41A being connected to lamp A in column 1, the segment of ring 41B being connected to lamp B in column 1 and so on, as shown. Similarly, each of the segments of commutator section C2 is connected to one of the lamps in column 2, the segment of ring 41A being connected to lamp A in column 2, the segment 41B being connected to lamp B in column 2 and so on, as shown. Likewise the segments of commutator section C3 are connected to the lamps in column 3 and so on.

The rotatable member 38 is connected with the sprocket wheels which drive the control band 22 in such manner as to cause said rotatable member to make one complete revolution during the time while said control band is advanced one frame length. Thus, it will be apparent that if the leading edge of a given frame of the control band has just passed the column of circuit control devices so that all of said devices are fully exposed as shown in Figure 1, and if, at this time the brushes 40A to 40J are in contact with the segments of commutator section C1 as shown in Figure 1, the circuits for all of the lamps of column 1 are completed by the commutator so that any lamp whose circuit controlling device has been operated by the control band while occupying the position of Figure 1 will be lighted.

If now it be assumed that the rotatable member 38 has been moved through one tenth of a revolution, the control band will then have been advanced one tenth of a frame length. Under these circumstances the brushes 40A to 40J are in contact with the segments of commutator section C2, and the circuits for all of the lamps of column 2 are completed. Likewise, as the rotatable member moves to commutator sections C3, C4 and so on the circuits for lamp columns 3, 4 and so on are completed, the circuits for each column being completed when a corresponding section of the film frame is in register with the circuit controlling devices 21A to 21J. Thus, by the time one complete frame length of the control band has passed the column of circuit controlling devices, the circuits for each of the columns of lamps will have been completed successively across the display panel. This process is repeated for each successive frame of the control band.

The control band may be advanced at any desired rate, depending on the display effect required. The slower the rate, of course, the less perfect the illusion of continuous motion will be. Good results may be obtained at rates of sixteen to twenty four frames per second, which is within the range of standard motion picture practice, but it is contemplated that rates in excess of twenty four frames per second may be used to advantage in some cases. At these rates, the eye of the observer will fail to detect the fact that the columns of lamps are lighted successively, rather than simultaneously for each frame, and the illusion of continuous motion from successive frames will be excellent.

The manner in which the intensity of illumination may be controlled may be explained with reference to Figures 5 and 6, in which the image to be shown on the display panel is illustrated in Figure 5, and in which the control band is illustrated in Figure 6 as a motion picture film having an image shown in one frame thereof. In the display panel image, three shades are represented by the areas $x$, $y$ and $z$, the area $x$ being brightly illuminated, the area $y$ (representing shadow) being dimly illuminated, and the background area $z$ being dark (no illumination). In the film image the three corresponding areas are represented by $x'$, $y'$ and $z'$, the area $x'$ being transparent, the area $y'$ being darkened, and the area $z'$ or background area being completely opaque. When the frame carrying said image has reached a position such as illustrated in Figure 6, with approximately the mid section of the frame in register with the column of circuit controlling devices (photo electric cells), the rotating arm of the commutator would have reached a position to contact the segments of commutator section C6, for example, to complete the circuits for the lamps of column 6.

Under these conditions, assuming the film to be suitably illuminated from above, the photo electric cells, it will be apparent that cells 21A, 21D, 21G, 21H, 21I and 21J will fail to receive any illumination through the opaque portions of the film which cover said cells. Consequently no current will pass through the direct current circuits to reactors 24A, 24D, 24G, 24H, 24I or 24J. Consequently, even though circuits to all of the lamps of column 6 are completed by the commutator, no appreciable current will flow through the power circuits to lamps A6, D6, G6, H6, I6, J6 and these lamps will remain dark.

On the other hand, the cells 21B and 21E, being in register with fully transparent portions of the film forming parts of the area $x'$ will receive full illumination. Therefore, full current will flow through the circuit to reactors 24B and 24E, and full current will flow through the power circuits which include lamps B6 and E6. These lamps, therefore, will be brightly lighted.

Cells 21C and 21F being in register with a darkened portion of the film forming part of the area $y'$ will receive only slight illumination. Therefore slight current will flow through the circuit to reactors 24C and 24F, and a proportionately slight current will flow through the power circuits which include the lamps C6 and F6. These lamps, therefore, will be only dimly lighted.

Therefore, the sixth column of lamps of the display panel would be illuminated, each with its proper intensity to produce that particular part of the image of Figure 5. And without repeating the description with respect to each other column of lamps, it will be apparent that as the control band is advanced across the control devices, the lamps of each column will be illuminated in their proper intensities as the columns are illuminated successively.

In actual commercial embodiments of the invention where the number of lamps in the display panel will be very large, the condition created when film areas of different density are in register with a single cell does not cause any serious loss of definition, as will be apparent if it is assumed, for example, that there are one hundred or more lamps to a column, and a hundred or more photo electric cells in register with the control band. In this connection, it may be noted that in such cases in view of the impossibility of mounting one hundred or more of such cells within the width of standard motion picture film, it is necessary to resort to indirect methods of securing registration, such as enlarging the film image by projecting it against a panel containing the required number of cells.

The application of the invention to colored display devices is shown in Figure 3. In this case a color separation is made, and a plurality of control bands are prepared with the correct color values for the selected component colors. For example, a three color separation might be made with the correct color values of red, yellow and blue on three separate control bands designated as R, Y and B.

Said control bands are fed as before by sprocket wheels (not shown) to register with three sets of circuit control devices R21A to R21J, Y21A to Y21J, and B21A to B21J. Each set of circuit controlling devices is connected, as before, with a set of reactors and a commutator, but for the sake of simplicity, only one reactor R24A, Y24A and B24A of each set is shown and the commutators are broken away to show only parts thereof.

In the display panel, the lamps are arranged in clusters, with a lamp for each of the color components in each cluster. Thus, each cluster would consist of a red lamp R1, a yellow lamp Y1, and a blue lamp B1, and each cluster would occupy the position of a single lamp of the previous description.

Thus, it will be seen that as the control bands are fed in synchronism, and in synchronism with the rotation of the commutators, the circuits for the three color components of each column of lamps will be completed simultaneously and successively and the component colors of each cluster of lamps will be blended together.

Furthermore, an infinite variety of color combinations may be secured by the variation in intensity of illumination made possible by the use of the reactors. Thus by varying the intensities of the blue and yellow components, for example, a wide range of greens may be secured.

In the foregoing description we have assumed the use of ordinary incandescent filament lamps, but for some purposes some of the newer light sources such as gas filled tubes may be used to advantage, all of such light sources being comprehended within the term lamp as used in this specification. In some cases, furthermore, it may be advisable to resort to known expedients such as relays, condensers, chokes, etc. to prolong the period of illumination of any lamp which has been lighted. Thus, for example, a lamp in column 1, lighted through commutator section C1, could by the use of such expedients be kept lighted during rotation of the movable arm of the commutator until a revolution thereof had been completed, at which time, it would either receive a new impulse which would keep it lighted, or would be allowed to go out, depending on the condition of its respective circuit controlling device at that time.

In the foregoing description we have referred to the control band as being divided into "frames," thus following customary motion picture terminology to designate the successive control areas of the control band. It will be understood, however, that the term "frames" as used in this specification refers to any equivalent succession of control areas of the control band which are used for a similar purpose.

In the foregoing description we have also referred to the use of motion picture film carrying photographic images as a convenient form of control band, but it will be understood that other forms of control band may be used, such as perforated tape having perforations of varying sizes and adapted to pass varying light intensities to the photo electric cells.

One such alternative form of control band is illustrated in Figure 7, in which, instead of a photographic image, the control band is provided with apertures or transparent areas of varying size adapted to admit varying amounts of light to the photo electric cells, such apertures or transparent areas being located within the "frame" area in positions adapted to produce the desired illumination on the display panel. Thus, in Figure 7, the single frame illustrated is provided with transparent areas properly located to produce the illuminated image shown in Figure 5. For example, assuming again that the frame is in the position illustrated, with approximately the mid section of the frame in register with the column of photo electric cells, and with the commutator arm in position to contact the segments of commutator section C6, it will be seen that cells 21A, 21D, 21G, 21H, 21I and 21J will receive no illumination, cells 21B and 21E being in register with large transparent areas will receive full illumination, while cells 21C and 21F, being in register with transparent areas of restricted size will receive slight illumination.

An alternative method of controlling the apparent intensity of illumination of the lamps of the display panel is illustrated in Figures 8 and 9. It will be understood that the apparent intensity of illumination, i. e. the effect on the eye of the observer, may be varied either by varying the actual intensity of illumination of fixed duration, as in the apparatus previously described, or by varying the duration of illumination of fixed actual intensity.

In controlling the apparent intensity of illumination by varying the duration of illumination of fixed intensity, as hereinafter described, we prefer to use gas filled tubes as lamps in the display panel, because such tubes can be made to provide very intense illumination for very brief periods of time, and the duration of illumination can be accurately controlled.

In this connection the phenomenon of persistence of vision may be referred to. It has now been established that the human eye will perceive a succession of flashes of light as a continuous or flickerless image if the successive flashes occur at a rate of at least fifty per second, irrespective of the duration of the successive flashes. Thus, if the eye observes a flashing light source in which the succession of flashes occurs at a rate of at least fifty per second, the eye will perceive an image of continuous illumination irrespective of whether the duration of the individual flashes is one one hundredth of a second or one one thousandth of a second or even one millionth of a second or less. However, if said flashes are of equal actual intensity, the apparent intensity of an image made up of a succession of flashes of one one thousandth of a second, for example, will be greater than that of an image made up of a succession of flashes of one ten thousandth of a second.

Applying these principles to the present invention, it will be seen that if the control band is advanced at a rate of fifty frames or more per second, each lamp of the display panel may be caused to flash fifty times per second to produce an image of continuous illumination. If, in addition, the duration of such flashes is controlled, the apparent intensity of illumination may be varied as desired.

Referring to Figure 8, the circuits of Figure 1 are shown as adapted to control the duration of flashes of fixed actual intensity. Here the reactors of Figure 1 are replaced by thermionic tubes 24A', 24B', etc. connected to the A. C. power circuit and to the direct current circuit as shown, the lead 50 being connected to the power circuit, and the leads 51 being connected to the brushes 35A, 35B, etc. of the commutator as shown in Figure 1. An additional battery 52 is provided as a source of current for the tube filaments. The commutator and the connections from the commutator to the lamps of the display panel are as shown in Figure 1.

For reasons which will be apparent hereinafter, however, the apertures to the photo electric cells 24A to 24J should be relatively narrow slits as indicated in Figures 8 and 9.

Referring now to the control band illustrated in Figure 9, it will be observed that the band is again provided with apertures or transparent areas of varying size, but in this case the variation is lengthwise of the band, so that as the band is advanced with respect to the control devices, the duration of exposure of the control devices to light will vary in accordance with the length of the aperture or transparent area. In Figure 9, the single frame illustrated is provided with transparent areas properly located to produce the illuminated image shown in Figure 5. For example, assuming again that the frame is in the position illustrated, and with the commutator arm in position to contact the segments of commutator section C6, it will be seen that cells 21A, 21D, 21G, 21H, 21I and 21J will receive no illumination, and the lamps connected to these cells will remain dark. On the other hand, cells 21B and 21E, being in register with full length transparent areas will receive light during the entire time required for the full length area to pass the slit aperture of the cell, and through the action of the thermionic tubes, the lamps B6 and E6 will be lighted a corresponding period of time. With respect to cells 21C and 21F, however, since the transparent areas in register therewith are very short lengthwise of the band, the time during which these cells will receive light will be short and the time during which the lamps C6 and F6 will be lighted will be correspondingly short. The difference in the duration of illumination will produce a difference in the apparent intensity of illumination which will produce the illusion of the image of Figure 5 on the eye of the observer.

It will be understood that variations of apparent intensity of illumination may be obtained by combining the feature of varying the actual intensity of illumination of fixed duration as illustrated in Figure 1 with the feature of varying the duration of illumination of fixed intensity as illustrated in Figure 8. It will also be understood that other methods of varying the apparent intensity of illumination, as, for example, by varying the frequency of flashes, may be employed either alone or in combination with the methods herein described.

It will be understood that the invention may be variously modified and embodied within the scope of the subjoined claims.

We claim as our invention:

1. In an electrically illuminated display device, in combination, a multiplicity of lamps arranged in a plurality of successive groups, the lamps of each group being equal in number, a single control band having a series of control frames, a single series of circuit controlling devices controlled by said control band, the number of controlling devices in said series corresponding to the number of lamps in each group, means for advancing said control band across said circuit controlling devices, means for completing circuits controlled by said series of circuit controlling devices successively to each of said successive groups of lamps while said control band is being advanced one frame length, and means in each of said circuits for controlling the apparent intensity of illumination of each of said lamps, said means being controlled by said circuit controlling devices.

2. In an electrically illuminated display device, in combination, a multiplicity of lamps arranged in a plurality of successive groups, the lamps of each group being equal in number, a single control band having a series of control frames, a single series of circuit controlling devices controlled by said control band, the number of controlling devices in said series corresponding to the number of lamps in each group, means for advancing said control band across said circuit controlling devices, a commutator adapted to complete circuits successively from said series of circuit controlling devices to each of said successive groups of said lamps while said control band is being advanced one frame length, and means in each of said circuits for controlling the apparent intensity of illumination of each of said lamps, said means being controlled by said circuit controlling devices.

3. In an electrically illuminated display device, in combination, a multiplicity of lamps arranged in a plurality of successive groups, the lamps of each group being equal in number, a single control band having a series of control frames, a single series of photo-electric cells controlled by said control band, the number of photo-electric cells in said series corresponding to the number of lamps in each group, means for advancing said control band across said photo-electric cells, means for completing circuits controlled by said photo-electric cells successively to each of said successive groups of lamps while said control band is being advanced one frame length, a thermionic tube in each of said circuits, said control band having light transmitting areas of varying capacity aligned with each of said photo-electric cells to vary the light impulses received by each of said photo-electric cells to thereby, through said thermionic tubes, vary the apparent intensity of illumination of each of said lamps.

FRED WALLER.
WILLIS ROBERT DRESSER.

REFERENCES CITED

The following references are of record in the file of this patent:

UNITED STATES PATENTS

| Number | Name | Date |
| --- | --- | --- |
| 1,419,256 | Hammond | June 13, 1922 |
| 1,550,036 | McCann | Aug. 18, 1925 |
| 1,769,060 | Hendry | July 1, 1930 |
| 1,930,545 | Wensley | Oct. 17, 1933 |
| 1,985,044 | Lyle | Dec. 18, 1934 |
| 2,063,006 | Rustad | Dec. 1, 1936 |
| 2,120,378 | Tauschek | June 14, 1938 |
| 2,148,450 | Eitzen | Feb. 28, 1939 |
| 2,384,869 | Zuckermann | Sept. 18, 1945 |

OTHER REFERENCES

Ser. No. 331,281, Zuckermann (A. P. C.), published May 18, 1943.